US012795668B2

(12) United States Patent
Hindy et al.

(10) Patent No.: US 12,795,668 B2
(45) Date of Patent: Nov. 10, 2026

(54) CONFIGURING CSI REPORTING FOR MULTI-TRP TRANSMISSION

(71) Applicant: Lenovo (Singapore) Pte. Ltd., New Tech Park (SG)

(72) Inventors: Ahmed Hindy, Aurora, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 366 days.

(21) Appl. No.: 18/559,302

(22) PCT Filed: May 4, 2022

(86) PCT No.: PCT/IB2022/054131
§ 371 (c)(1),
(2) Date: Nov. 6, 2023

(87) PCT Pub. No.: WO2022/234486
PCT Pub. Date: Nov. 10, 2022

(65) Prior Publication Data

US 2024/0236987 A1 Jul. 11, 2024

Related U.S. Application Data

(60) Provisional application No. 63/185,220, filed on May 6, 2021.

(51) Int. Cl.

| | |
|---|---|
| ***H04W 72/1273*** | (2023.01) |
| ***H04B 7/06*** | (2006.01) |
| ***H04W 72/232*** | (2023.01) |

(52) U.S. Cl.
CPC ...... *H04W 72/1273* (2013.01); *H04B 7/0626* (2013.01); *H04B 7/0632* (2013.01); *H04W 72/232* (2023.01)

(58) Field of Classification Search
CPC ............ H04W 72/1273; H04W 72/232; H04B 7/0626; H04B 7/0632; H04L 5/0032; H04L 5/0057; H04L 5/005
See application file for complete search history.

(56) References Cited

U.S. PATENT DOCUMENTS

2016/0295576 A1* 10/2016 Dinan .................. H04L 5/0037
2021/0028843 A1* 1/2021 Zhou ...................... H04B 7/063
(Continued)

OTHER PUBLICATIONS

PCT/IB2022/054131, "Notification of Transmittal of the International Search Report and the Written Opinion of the International Searching Authority, or the Declaration", International Searching Authority, Jul. 4, 2022, pp. 1-15.
(Continued)

*Primary Examiner* — Kiet Tang
(74) *Attorney, Agent, or Firm* — Kunzler Needham & Hilton; Bruce R. Needham

(57) ABSTRACT

Apparatuses, methods, and systems are disclosed for configuring CSI reporting for multi-TRP transmission. One method includes receiving reference signals over two CSI-RS resources. Each CSI-RS resource corresponds to one transmission point of two transmission points in a network. The method includes configuring CSI reporting for multi-TRP transmission based on multi-DCI PDSCH transmission, single-DCI PDSCH transmission, or a combination thereof. The CSI reporting is configured via a CSI reporting setting that configures the UE to report at least one CSI report to the network, and the at least one CSI report comprises CSI corresponding to single-TRP transmission, multi-TRP transmission, or a combination thereof.

18 Claims, 13 Drawing Sheets

(56) References Cited

U.S. PATENT DOCUMENTS

| | | | | |
|---|---|---|---|---|
| 2022/0103330 | A1* | 3/2022 | Li | H04L 1/1671 |
| 2023/0189261 | A1* | 6/2023 | Matsumura | H04L 5/0094 370/329 |

OTHER PUBLICATIONS

Samsung et al., "WF on Type I and II CSI codebooks", 3GPP TSG-RAN WG1 #89 R1-1709232, May 15-19, 2017, pp. 1-24.
Huawei et al., "CSI measurement enhancement for multi-TRP/panel transmission", 3GPP TSG RAN WG1 Meeting #97 R1-1906038, May 13-17, 2019, pp. 1-4.
LG Electronics, "Discussion on CSI enhancement for NCJT", 3GPP TSG RAN WG1 #97 R1-1906736, May 13-17, 2019, pp. 1-3.
Ericsson, "Views on CSI framework for multi-TRP", 3GPP TSG RAN WG1 Meeting #97 R1-1907424, May 13-17, 2019, pp. 1-2.
Spreadtrum Communications, "Discussion on CSI enhancement for multiple TRP/Panel transmission", 3GPP TSG RAN WG1 #98 R1-1908961, Aug. 26-30, 2019, pp. 1-4.
Vivo, "Discussion on MTRP multi-beam enhancement", 3GPP TSG RAN WG1 #102-e R1-2005366, Aug. 17-28, 2020, pp. 1-5.
Spreadtrum Communications, "Discussion on CSI enhancement for multi-TRP and FR1 FDD reciprocity", 3GPP TSG RAN WG1 #104-e R1-2100789, Jan. 25-Feb. 5, 2021, pp. 1-7.
Lenovo et al., "CSI enhancements for mTRP and FDD reciprocity", 3GPP TSG RAN WG1 #104-e R1-2100989, Jan. 25-Feb. 5, 2021, pp. 1-13.
3GPP, "3rd Generation Partnership Project; Technical Specification Group Radio Access Network; NR; Multiplexing and channel coding (Release 16)", 3GPP TS 38.212 V16.5.0, Mar. 2021, pp. 1-152.
3GPP, "3rd Generation Partnership Project; Technical Specification Group Radio Access Network; NR; Physical layer procedures for data (Release 16)", 3GPP TS 38.214 V16.5.0, Mar. 2021, pp. 1-171.
3GPP, "3rd Generation Partnership Project; Technical Specification Group Radio Access Network; NR; Radio Resource Control (RRC) protocol specification (Release 16)", 3GPP TS 38.331 V16.3.1, Jan. 2021, pp. 1-932.

* cited by examiner

400

```
-- ASN1START
-- TAG-CSI-REPORTCONFIG-START

CSI-ReportConfig ::=                 SEQUENCE {
    reportConfigId                           CSI-ReportConfigId,
    carrier                                  ServCellIndex            OPTIONAL,    -- Need S
    resourcesForChannelMeasurement           CSI-ResourceConfigId,
    csi-IM-ResourcesForInterference          CSI-ResourceConfigId     OPTIONAL,    -- Need R
    nzp-CSI-RS-ResourcesForInterference      CSI-ResourceConfigId     OPTIONAL,    -- Need R


    reportConfigType                         CHOICE {
        periodic                               SEQUENCE {
            reportSlotConfig                   CSI-ReportPeriodicityAndOffset,
            pucch-CSI-ResourceList             SEQUENCE (SIZE (1..maxNrofBWPs)) OF PUCCH-CSI-Resource
        },
        semiPersistentOnPUCCH                  SEQUENCE {
            reportSlotConfig                   CSI-ReportPeriodicityAndOffset,
            pucch-CSI-ResourceList             SEQUENCE (SIZE (1..maxNrofBWPs)) OF PUCCH-CSI-Resource
        },
        semiPersistentOnPUSCH                 SEQUENCE {
            reportSlotConfig                  ENUMERATED {sl5, sl10, sl20, sl40, sl80, sl160, sl320},
            reportSlotOffsetList              SEQUENCE (SIZE (1.. maxNrofUL-Allocations)) OF INTEGER(0..32),
            p0alpha                                   P0-PUSCH-AlphaSetId
        },
        aperiodic                             SEQUENCE {
            reportSlotOffsetList              SEQUENCE (SIZE (1..maxNrofUL-Allocations)) OF INTEGER(0..32)
        }
    },
    mTRP-CSI-Enabled                          ENUMERATED (TRUE)        OPTIONAL,  -- Need R

                                             {...............}

-- TAG-CSI-REPORTCONFIG-STOP
-- ASN1STOP
```

FIG. 4

500

```
-- ASN1START
-- TAG-CSI-REPORTCONFIG-START

CSI-ReportConfig ::=                SEQUENCE {
    reportConfigId                          CSI-ReportConfigId,
    carrier                                 ServCellIndex           OPTIONAL,    -- Need S
    resourcesForChannelMeasurement          CSI-ResourceConfigId,
    csi-IM-ResourcesForInterference         CSI-ResourceConfigId    OPTIONAL,    -- Need R
    nzp-CSI-RS-ResourcesForInterference     CSI-ResourceConfigId    OPTIONAL,    -- Need R


    reportConfigType                        CHOICE {
        periodic                              SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUCCH                 SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUSCH                SEQUENCE {
            reportSlotConfig                 ENUMERATED {sl5, sl10, sl20, sl40, sl80, sl160, sl320},
            reportSlotOffsetList             SEQUENCE (SIZE (1.. maxNrofUL-Allocations)) OF INTEGER(0..32),
            p0alpha                                 P0-PUSCH-AlphaSetId
        },
        aperiodic                            SEQUENCE {
            reportSlotOffsetList             SEQUENCE (SIZE (1..maxNrofUL-Allocations)) OF INTEGER(0..32)
        }
    },
    numberOfReports                                 ENUMERATED {1,2,3,4}      OPTIONAL,  -- Need R

                                     [..........................]

-- TAG-CSI-REPORTCONFIG-STOP
-- ASN1STOP
```

FIG. 5

600

```
-- ASN1START
-- TAG-CODEBOOKCONFIG-START

CodebookConfig ::=                              SEQUENCE {
    codebookType                                    CHOICE {

                                        [.....................]
    }
    numReports                      ENUMERATED {1,2}            OPTIONAL,       -- Need R
}

CodebookConfig-r16  ::=             SEQUENCE  {
    codebookType                                    CHOICE {

                                        [.....................]
    }
    numReports                      ENUMERATED {1,2}            OPTIONAL,       -- Need R
}

-- TAG-CODEBOOKCONFIG-STOP
-- ASN1STOP
```

FIG. 6

700

```
-- ASN1START
-- TAG-CSI-REPORTCONFIG-START

CSI-ReportConfig ::=                SEQUENCE {
    reportConfigId                          CSI-ReportConfigId,
    carrier                                 ServCellIndex            OPTIONAL,   -- Need S
    resourcesForChannelMeasurement          CSI-ResourceConfigId,
    csi-IM-ResourcesForInterference         CSI-ResourceConfigId     OPTIONAL,   -- Need R
    nzp-CSI-RS-ResourcesForInterference     CSI-ResourceConfigId     OPTIONAL,   -- Need R

                                        [..........................]

    timeRestrictionForChannelMeasurements       ENUMERATED {configured, notConfigured},
    timeRestrictionForInterferenceMeasurements  ENUMERATED {configured, notConfigured},
    codebookConfig                              CodebookConfig              OPTIONAL,   -- Need R
    codebookConfig2                             CodebookConfig              OPTIONAL,   -- Need R
    dummy                                       ENUMERATED {n1, n2}         OPTIONAL,   -- Need R

                                        [..........................]

    reportQuantity-r16                          CHOICE {
       cri-SINR-r16                                 NULL,
       ssb-Index-SINR-r16                           NULL
    }                                                                       OPTIONAL,   -- Need R
    codebookConfig-r16                          CodebookConfig-r16          OPTIONAL    -- Need R
    codebookConfig2-r17                         CodebookConfig-r17          OPTIONAL    -- Need R
    ]]
}

                                        [..........................]

-- TAG-CSI-REPORTCONFIG-STOP
-- ASN1STOP
```

FIG. 7

800

```
-- ASN1START
-- TAG-CSI-REPORTCONFIG-START

CSI-ReportConfig ::=                  SEQUENCE {
    reportConfigId                         CSI-ReportConfigId,
    carrier                                ServCellIndex             OPTIONAL,   -- Need S
    resourcesForChannelMeasurement         CSI-ResourceConfigId,
    csi-IM-ResourcesForInterference        CSI-ResourceConfigId      OPTIONAL,   -- Need R
    nzp-CSI-RS-ResourcesForInterference    CSI-ResourceConfigId      OPTIONAL,   -- Need R

                                           [..............]

    reportQuantity                         CHOICE {
        none                                   NULL,
        cri-RI-PMI-CQI                         NULL,
        cri-RI-i1                              NULL,
        cri-RI-i1-CQI                          SEQUENCE {
            pdsch-BundleSizeForCSI                 ENUMERATED {n2, n4}       OPTIONAL    -- Need S
        },
        cri-RI-CQI                             NULL,
        cri-RSRP                               NULL,
        ssb-Index-RSRP                         NULL,
        cri-RI-LI-PMI-CQI                      NULL
    },
    reportQuantity1                         CHOICE {
        none                                   NULL,
        cri-RI-PMI-CQI                         NULL,
        cri-RI-i1                              NULL,
        cri-RI-i1-CQI                          SEQUENCE {
            pdsch-BundleSizeForCSI                 ENUMERATED {n2, n4}       OPTIONAL    -- Need S
        },
        cri-RI-CQI                             NULL,
        cri-RSRP                               NULL,
        ssb-Index-RSRP                         NULL,
        cri-RI-LI-PMI-CQI                      NULL
    },                                                              OPTIONAL,   -- Need R

}

                                           [..............]

-- TAG-CSI-REPORTCONFIG-STOP
-- ASN1STOP
```

FIG. 8

900

```
-- ASN1START
-- TAG-REPETITIONSCHEMECONFIG-START

RepetitionSchemeConfig-r17 ::= CHOICE {
    fdm-TDM-r17                          SetupRelease { FDM-TDM-r17 },
    slotBased-r17                        SetupRelease { SlotBased-r17 }
}


FDM-TDM-r17 ::=                SEQUENCE {
    repetitionScheme-r17           ENUMERATED {fdmSchemeA, fdmSchemeB,tdmSchemeA, sdmSchemeA},
    startingSymbolOffsetK-r17      INTEGER (0..7)                                    OPTIONAL  --
Need R
}

SlotBased-r17 ::=              SEQUENCE {
    tciMapping-r17                 ENUMERATED {cyclicMapping, sequentialMapping},
    sequenceOffsetForRV-r17        INTEGER (0..3)
}


-- TAG-REPETITIONSCHEMECONFIG-STOP
-- ASN1STOP
```

FIG. 9

1000

```
-- ASN1START
-- TAG-CSI-REPORTCONFIG-START

CSI-ReportConfig ::=                SEQUENCE {
    reportConfigId                          CSI-ReportConfigId,
    carrier                                 ServCellIndex           OPTIONAL,    -- Need S
    resourcesForChannelMeasurement          CSI-ResourceConfigId,
    csi-IM-ResourcesForInterference         CSI-ResourceConfigId    OPTIONAL,    -- Need R
    nzp-CSI-RS-ResourcesForInterference     CSI-ResourceConfigId    OPTIONAL,    -- Need R


    reportConfigType                        CHOICE {
        periodic                              SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUCCH                 SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUSCH                SEQUENCE {
            reportSlotConfig                 ENUMERATED {sl5, sl10, sl20, sl40, sl80, sl160, sl320},
            reportSlotOffsetList             SEQUENCE (SIZE (1.. maxNrofUL-Allocations)) OF INTEGER(0..32),
            p0alpha                                 P0-PUSCH-AlphaSetId
        },
        aperiodic                            SEQUENCE {
            reportSlotOffsetList             SEQUENCE (SIZE (1..maxNrofUL-Allocations)) OF INTEGER(0..32)
        }
    },
    mTRP-CSI-Enabled                         ENUMERATED {TRUE}       OPTIONAL,   -- Need R


    mTRP-CSI-mode                            ENUMERATED {mDCI,sDCI}  OPTIONAL,   -- Need R

                                           {..................}

-- TAG-CSI-REPORTCONFIG-STOP
-- ASN1STOP
```

FIG. 10

1100

```
-- ASN1START
-- TAG-CSI-REPORTCONFIG-START

CSI-ReportConfig ::=                SEQUENCE {
    reportConfigId                          CSI-ReportConfigId,
    carrier                                 ServCellIndex            OPTIONAL,   -- Need S
    resourcesForChannelMeasurement          CSI-ResourceConfigId,
    csi-IM-ResourcesForInterference         CSI-ResourceConfigId     OPTIONAL,   -- Need R
    nzp-CSI-RS-ResourcesForInterference     CSI-ResourceConfigId     OPTIONAL,   -- Need R


    reportConfigType                        CHOICE {
        periodic                              SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUCCH                 SEQUENCE {
            reportSlotConfig                  CSI-ReportPeriodicityAndOffset,
            pucch-CSI-ResourceList            SEQUENCE (SIZE (1..maxNrofBWPs)) OF PUCCH-CSI-Resource
        },
        semiPersistentOnPUSCH                SEQUENCE {
            reportSlotConfig                 ENUMERATED {sl5, sl10, sl20, sl40, sl80, sl160, sl320},
            reportSlotOffsetList             SEQUENCE (SIZE (1.. maxNrofUL-Allocations)) OF INTEGER(0..32),
            p0alpha                                 P0-PUSCH-AlphaSetId
        },
        aperiodic                            SEQUENCE {
            reportSlotOffsetList             SEQUENCE (SIZE (1..maxNrofUL-Allocations)) OF INTEGER(0..32)
        }
    },
    mTRP-CSI-Enabled                         ENUMERATED {TRUE}        OPTIONAL,  -- Need R
    secondary-reportConfigId                 CSI-ReportConfigId       OPTIONAL,  -- Need R

                                            [.....................]

-- TAG-CSI-REPORTCONFIG-STOP
-- ASN1STOP
```

FIG. 11

CONFIGURING CSI REPORTING FOR MULTI-TRP TRANSMISSION

CROSS-REFERENCE TO RELATED APPLICATIONS

This application claims priority to U.S. Patent Application Ser. No. 63/185,220 entitled "APPARATUSES, METHODS, AND SYSTEMS FOR UNIFIED CSI FRAMEWORK FOR MULTI-TRP UNDER SINGLE-DCI AND MULTI-DCI TRANSMISSION" and filed on May 6, 2021 for Ahmed Hindy et al., which is incorporated herein by reference in its entirety.

FIELD

The subject matter disclosed herein relates generally to wireless communications and more particularly relates to configuring CSI reporting for multi-TRP transmission.

BACKGROUND

In certain wireless communications networks, single-DCI and multi-DCI transmissions may be used. In such networks, single-DCI and multi-DCI may not be configured for optimal performance together.

BRIEF SUMMARY

Methods for configuring CSI reporting for multi-TRP transmission are disclosed. Apparatuses and systems also perform the functions of the methods. One embodiment of a method includes receiving, at a UE, reference signals over two CSI-RS resources. Each CSI-RS resource corresponds to one transmission point of two transmission points in a network. In some embodiments, the method includes configuring CSI reporting for multi-TRP transmission based on multi-DCI PDSCH transmission, single-DCI PDSCH transmission, or a combination thereof. The CSI reporting is configured via a CSI reporting setting that configures the UE to report at least one CSI report to the network, and the at least one CSI report comprises CSI corresponding to single-TRP transmission, multi-TRP transmission, or a combination thereof.

One apparatus for configuring CSI reporting for multi-TRP transmission includes a receiver to receive reference signals over two CSI-RS resources. Each CSI-RS resource corresponds to one transmission point of two transmission points in a network. In various embodiments, the apparatus includes a processor to configure CSI reporting for multi-TRP transmission based on multi-DCI PDSCH transmission, single-DCI PDSCH transmission, or a combination thereof. The CSI reporting is configured via a CSI reporting setting that configures the UE to report at least one CSI report to the network, and the at least one CSI report comprises CSI corresponding to single-TRP transmission, multi-TRP transmission, or a combination thereof.

Another embodiment of a method for configuring CSI reporting for multi-TRP transmission includes transmitting, from at least one network device, reference signals over two CSI-RS resources. Each CSI-RS resource corresponds to one transmission point of two transmission points in a network. CSI reporting for multi-TRP transmission is configured based on multi-DCI PDSCH transmission, single-DCI PDSCH transmission, or a combination thereof, and the CSI reporting is configured via a CSI reporting setting that configures a UE to report at least one CSI report to the network, and the at least one CSI report comprises CSI corresponding to single-TRP transmission, multi-TRP transmission, or a combination thereof.

Another apparatus for configuring CSI reporting for multi-TRP transmission includes at least one transmitter to transmit reference signals over two CSI-RS resources. Each CSI-RS resource corresponds to one transmission point of two transmission points in a network. CSI reporting for multi-TRP transmission is configured based on multi-DCI PDSCH transmission, single-DCI PDSCH transmission, or a combination thereof, and the CSI reporting is configured via a CSI reporting setting that configures a UE to report at least one CSI report to the network, and the at least one CSI report comprises CSI corresponding to single-TRP transmission, multi-TRP transmission, or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a schematic block diagram illustrating one embodiment of ASN.1 code for a CSI-ReportConfig reporting setting IE with a multi-TRP transmission indication according to the second embodiment of the first set of embodiments:

FIG. 5 is a schematic block diagram illustrating one embodiment of ASN.1 code for triggering more than one CSI report within a CSI-ReportConfig reporting setting IE according to the third embodiment of the first set of embodiments:

FIG. 6 is a schematic block diagram illustrating one embodiment of ASN.1 code for triggering two CSI reports within a CodebookConfig codebook configuration IE according to the third embodiment of the first set of embodiments:

FIG. 7 is a schematic block diagram illustrating one embodiment of ASN.1 code for triggering two CSI reports within a CSI-ReportConfig reporting setting IE according to the fourth embodiment of the first set of embodiments:

FIG. 8 is a schematic block diagram illustrating one embodiment of ASN.1 code for triggering two CSI reports within a CSI-ReportConfig reporting setting IE according to the fifth embodiment of the first set of embodiments:

FIG. 9 is a schematic block diagram illustrating one embodiment of ASN.1 code for a RepetitionSchemeConfig repetition scheme configuration IE according to the sixth embodiment of the first set of embodiments:

FIG. 10 is a schematic block diagram illustrating one embodiment of ASN.1 code for a CSI-ReportConfig reporting setting IE with a higher-layer parameter that triggers multi-TRP based CSI reporting according to the seventh embodiment of the first set of embodiments:

FIG. 11 is a schematic block diagram illustrating one embodiment of ASN.1 code for a CSI-ReportConfig reporting setting IE with indication of a second CSI-ReportConfig reporting setting according to the first embodiment of the fifth set of embodiments:

DETAILED DESCRIPTION

Figure 1:
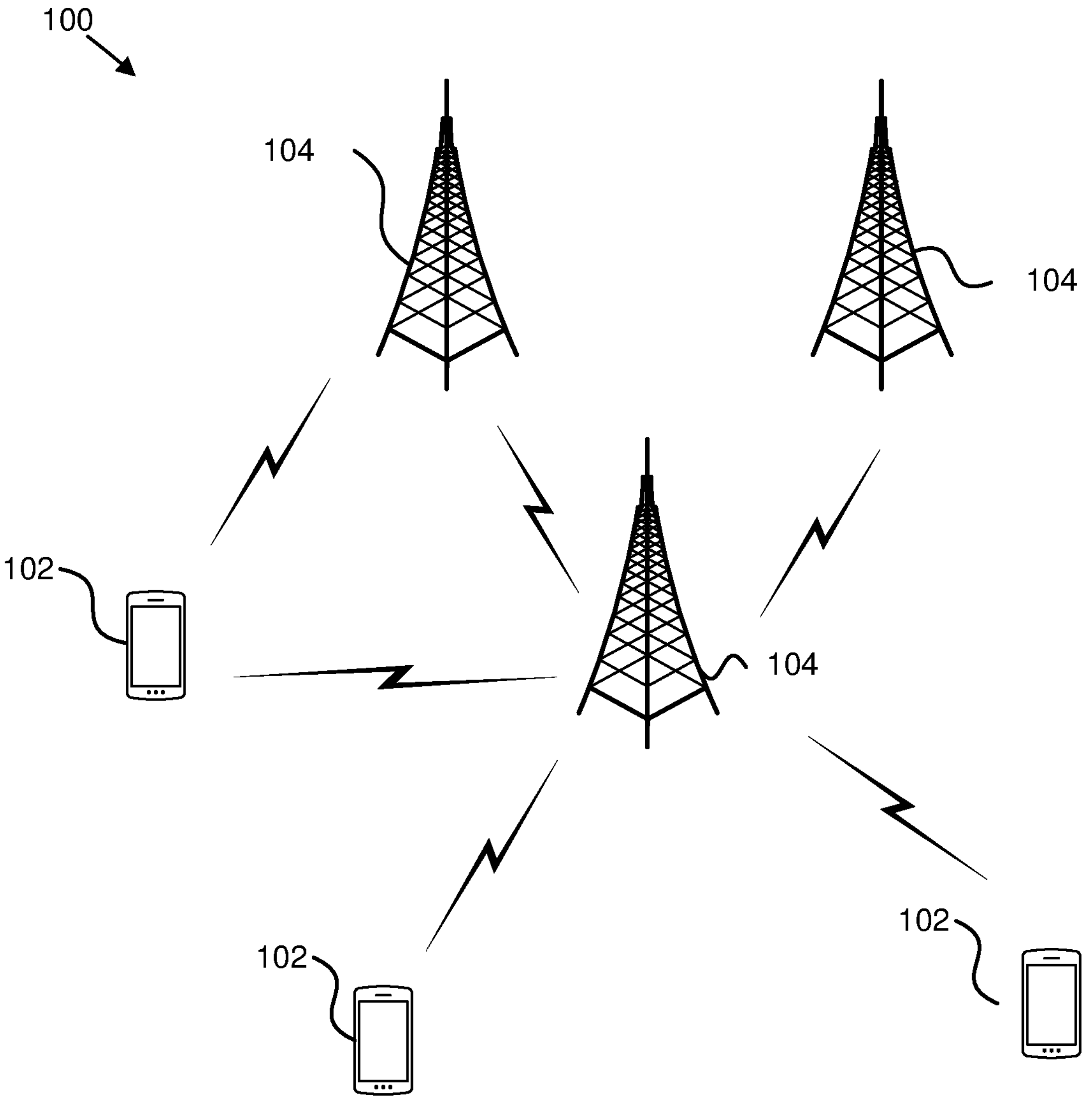
FIG. 1 is a schematic block diagram illustrating one embodiment of a wireless communication system for configuring CSI reporting for multi-TRP transmission.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having." and variations thereof mean "including but not limited to," unless 20 expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring CSI reporting for multi-TRP transmission. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth R, ZigBee, Sigfox, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive reference signals over two CSI-RS resources. Each CSI-RS resource corresponds to one transmission point of two transmission points in a network. In some embodiments, the remote unit 102 may configure CSI reporting for multi-TRP transmission based on multi-DCI PDSCH transmission, single-DCI PDSCH transmission, or a combination thereof. The CSI reporting is configured via a CSI reporting setting that configures the UE to report at least one CSI report to the network, and the at least one CSI report comprises CSI corresponding to single-TRP transmission, multi-TRP transmission, or a combination thereof. Accordingly, the remote unit 102 may be used for configuring CSI reporting for multi-TRP transmission.

In certain embodiments, at least one network unit 104 may transmit reference signals over two CSI-RS resources. Each CSI-RS resource corresponds to one transmission point of two transmission points in a network. CSI reporting for multi-TRP transmission is configured based on multi-DCI PDSCH transmission, single-DCI PDSCH transmission, or a combination thereof, and the CSI reporting is configured via a CSI reporting setting that configures a UE to report at least one CSI report to the network, and the at least one CSI report comprises CSI corresponding to single-TRP transmission, multi-TRP transmission, or a combination thereof. Accordingly, the at least one network unit 104 may be used for configuring CSI reporting for multi-TRP transmission.

Figure 2:
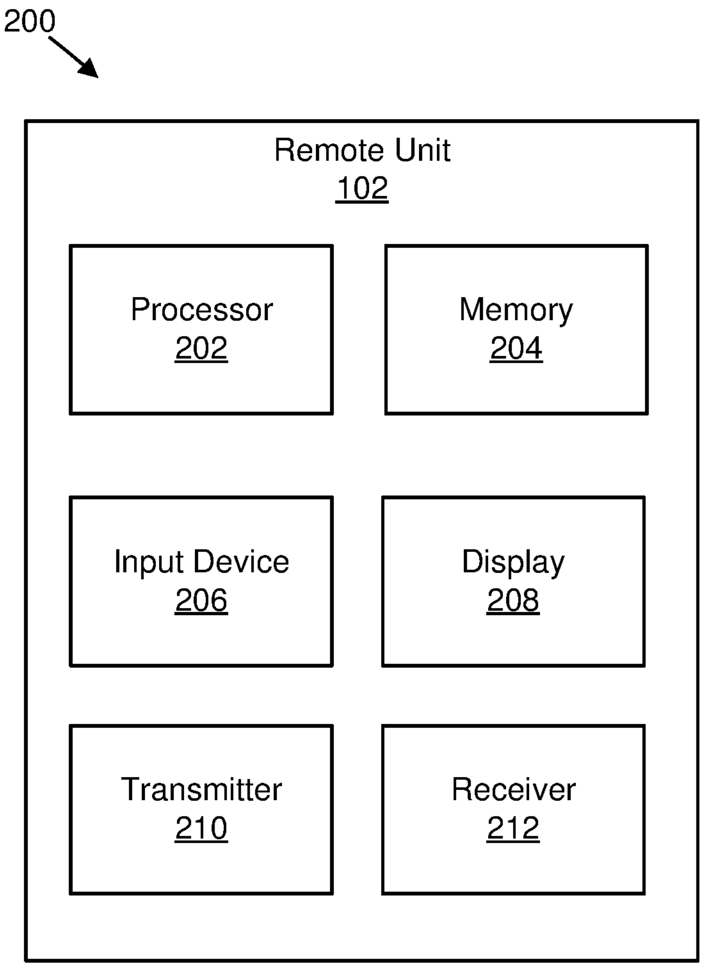
FIG. 2 is a schematic block diagram illustrating one embodiment of an apparatus that may be used for configuring CSI reporting for multi-TRP transmission.

FIG. 2 depicts one embodiment of an apparatus 200 that may be used for configuring CSI reporting for multi-TRP transmission. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 may receive reference signals over two CSI-RS resources. Each CSI-RS resource corresponds to one transmission point of two transmission points in a network. In various embodiments, the processor 202 may configure CSI reporting for multi-TRP transmission based on multi-DCI PDSCH transmission, single-DCI PDSCH transmission, or a combination thereof. The CSI reporting is configured via a CSI reporting setting that configures the UE to report at least one CSI report to the network, and the at least one CSI report comprises CSI corresponding to single-TRP transmission, multi-TRP transmission, or a combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
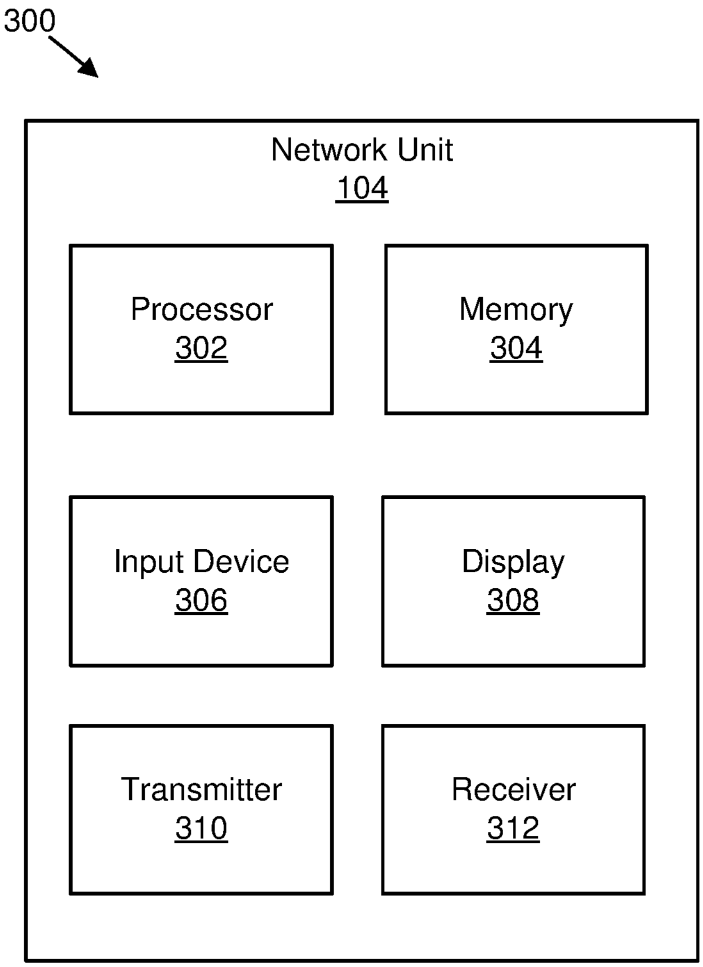
FIG. 3 is a schematic block diagram illustrating one embodiment of an apparatus that may be used for configuring CSI reporting for multi-TRP transmission.

FIG. 3 depicts one embodiment of an apparatus 300 that may be used for configuring CSI reporting for multi-TRP transmission. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, at least one transmitter 310 transmits reference signals over two CSI-RS resources. Each CSI-RS resource corresponds to one transmission point of two transmission points in a network. CSI reporting for multi-TRP transmission is configured based on multi-DCI PDSCH transmission, single-DCI PDSCH transmission, or a combination thereof, and the CSI reporting is configured via a CSI reporting setting that configures a UE to report at least one CSI report to the network, and the at least one CSI report comprises CSI corresponding to single-TRP transmission, multi-TRP transmission, or a combination thereof.

It should be noted that one or more embodiments described herein may be combined into a single embodiment.

In certain embodiments, such as for 3GPP new radio ("NR"), multiple transmission and reception points ("TRPs") or multi-antenna panels within a TRP may communicate simultaneously with one UE to enhance coverage, throughput, and/or reliability. This may come at the expense of excessive control signaling between a network side and a user equipment ("UE") side, so as to communicate the best transmission configuration (e.g., whether to support multipoint transmission), and if so, which TRPs would operate simultaneously, in addition to a possibly super-linear increase in the amount of channel state information ("CSI") feedback reported from the UE to the network, since a distinct report may be needed for each transmission configuration. In some embodiments, for Type-II codebook with high resolution, a number of precoder matrix indicator ("PMI") bits fed back from the UE in a gNB via uplink control information ("UCI") may be very large (e.g., >1000 bits at large bandwidth), even for a single-point transmission. Thereby, reducing the number of PMI feedback bits per report may be important to improve efficiency. In various embodiments, multiple-input multiple-output ("MIMO") may include multi-TRP and multi-panel transmissions. The purpose of multi-TRP transmission may be to improve a spectral efficiency as well as a reliability and robustness of a connection in different scenarios, and may cover both ideal and nonideal backhaul. For increasing the reliability using multi-TRP, ultra-reliable low-latency communication ("URLLC") under multi-TRP transmission may be used, where the UE may be served by multiple TRPs forming a coordination cluster, possibly connected to a central processing unit.

In some embodiments, a UE may be dynamically scheduled to be served by one of multiple TRPs in a cluster. A network may also pick two TRPs to perform joint transmission. In either case, the UE may need to report needed CSI information for the network for it to decide the multi-TRP downlink transmission scheme.

In various embodiments, a number of transmission hypotheses increases exponentially with a number of TRPs in a coordination cluster. For example, for 4 TRPs, there may be 10 transmission hypotheses: (TRP 1), (TRP 2), (TRP 3), (TRP 4), (TRP 1, TRP 2), (TRP 1, TRP 3), (TRP 1, TRP 4), (TRP 2, TRP 3), (TRP 2, TRP 4), and (TRP 3, TRP 4). The overhead from reporting may increase dramatically with the size of the coordination cluster. For example, the presence of K TRPs may trigger up to $$K + \binom{K}{n},$$

where $$\binom{K}{n}$$

represents the binomial coefficient representing the number of possible unordered n-tuples selected from a set of K elements, where n≤K.

In certain embodiments, UL transmission resources on which the CSI reports are transmitted might not be enough, and partial CSI omission might be necessary. CSI reports may be prioritized according to: 1) time-domain behavior and physical channel where more dynamic reports are given precedence over less dynamic reports and PUSCH has precedence over PUCCH: 2) CSI content, where beam reports (e.g., layer 1 ("L1") reference signal received power ("RSRP") ("L1-RSRP") reporting) has priority over regular CSI reports: 3) the serving cell to which the CSI corresponds (e.g., for carrier aggregation ("CA") operation)—CSI corresponding to the PCell has priority over CSI corresponding to SCells: and/or 4) a CSI report setting ID (e.g., reportConfigID).

In some embodiments, multi-TRP transmission with either single downlink control information ("DCI") ("single-DCI") or multi-DCI helps achieve the following: 1) provide a unified CSI framework that can be useful when the UE is scheduled with either a single DCI that schedules one physical downlink shared channel ("PDSCH") transmission or multiple DCI that schedule multiple PDSCH transmissions; 2) enhance DCI signaling (e.g., in terms of DCI format and other DCI design details) to ensure concise and/or robust DL signaling for multi-TRP transmission under multi-DCI; and/or 3) provide efficient CSI configuration and reporting for multi-DCI multi-TRP transmission.

In various embodiments, there may be codebook reporting. The codebook report is partitioned into two parts based on the priority of information reported. Each part is encoded separately (Part 1 has a possibly higher code rate).

In certain embodiments, there may be a content of a CSI report as follows. Part 1: RI+CQI+Total number of coefficients. Part 2: SD basis indicator+FD basis indicator/layer+Bitmap/layer+Coefficient Amplitude info/layer+Coefficient Phase info/layer+Strongest coefficient indicator/layer. Furthermore, Part 2 CSI can be decomposed into sub-parts each with different priority (higher priority information listed first). Such partitioning is required to allow dynamic reporting size for codebook based on available resources in the uplink phase. Also Type-II codebook is based on aperiodic CSI reporting, and only reported in PUSCH via DCI triggering (one exception). Type-I codebook can be based on periodic CSI reporting (PUCCH) or semi-persistent CSI reporting (PUSCH or PUCCH) or aperiodic reporting (PUSCH).

In some embodiments, there may be priority reporting for Part 2 CSI. It should be noted that multiple CSI reports may be transmitted as shown in Table 1.

TABLE 1

| CSI Reports priority ordering |
|---|
| Priority 0:<br>For CSI reports 1 to $N_{Rep}$, Group 0 CSI for CSI reports configured as 'typeII-rl6' or 'typeII-PortSelection-rl6'; Part 2 wideband CSI for CSI reports configured otherwise<br>Priority 1:<br>Group 1 CSI for CSI report 1, if configured as 'typeII-rl6' or 'typeII-PortSelection-rl6'; Part 2 subband CSI of even subbands for CSI report 1, if configured otherwise<br>Priority 2:<br>Group 2 CSI for CSI report 1, if configured as 'typeII-rl6' or 'typeII-PortSelection-rl6'; Part 2 subband CSI of odd subbands for CSI report 1, if configured otherwise<br>Priority 3:<br>Group 1 CSI for CSI report 2, if configured as 'typeII-rl6' or 'typeII-PortSelection-rl6'; Part 2 subband CSI of even subbands for CSI report 2, if configured otherwise<br>Priority 4:<br>Group 2 CSI for CSI report 2, if configured as 'typeII-rl6' or 'typeII-PortSelection-rl6'. Part 2 subband CSI of odd subbands for CSI report 2, if configured otherwise<br>.<br>.<br>.<br>Priority $2N_{Rep}-1$:<br>Group 1 CSI for CSI report NRep, if configured as 'typeII-rl6' or 'typeII-PortSelection-rl6'; Part 2 subband CSI of even subbands for CSI report $N_{Rep}$, if configured otherwise<br>Priority $2N_{Rep}$:<br>Group 2 CSI for CSI report $N_{Rep}$, if configured as 'typeII-rl6' or 'typeII-PortSelection-rl6'; Part 2 subband CSI of odd subbands for CSI report $N_{Rep}$, if configured otherwise |

It should be noted that the priority of the NRep CSI reports are based on the following. A CSI report corresponding to one CSI reporting configuration for one cell may have higher priority compared with another CSI report corresponding to one other CSI reporting configuration for the same cell. CSI reports intended to one cell may have higher priority compared with other CSI reports intended to another cell. CSI reports may have higher priority based on the CSI report content (e.g., CSI reports carrying L1-RSRP information have higher priority). CSI reports may have higher priority based on their type (e.g., whether the CSI report is aperiodic, semi-persistent or periodic, and whether the report is sent via PUSCH or PUCCH, may impact the priority of the CSI report).

In light of that, CSI reports may be prioritized as follows, where CSI reports with lower IDs have higher priority: $Pri_{iCSI}(y, k, c, s)=2\cdot N_{cells}\cdot M_s\cdot\gamma+N_{cells}\cdot M_s\cdot k+M_s\cdot c+s$, s: CSI reporting configuration index, and Ms: Maximum number of CSI reporting configurations, c: Cell index, and Ncells: Number of serving cells, k: 0 for CSI reports carrying L1-RSRP or L1-SINR, 1 otherwise, y: 0 for aperiodic reports, 1 for semi-persistent reports on PUSCH, 2 for semi-persistent reports on PUCCH, 3 for periodic reports.

In some embodiments, there may be triggering of aperiodic CSI reporting on PUSCH. For multi-TRP URLLC transmission, five schemes may be used. Scheme 1a (SDM): two TRPs transmit a PDSCH with overlapped time and frequency resource within a single slot. Scheme 2a (FDM): two TRPs transmit a PDSCH with one RV across non-overlapping comb-like frequency resources assigned to different TRPs within a single slot. Scheme 2b (FDM): two TRPs transmit a PDSCH with different RVs across non-overlapping comb-like frequency resources assigned to different TRPs within a single slot. Scheme 3 (TDM): two TRPs transmit up to 2 TDMed PDSCH transmission occasions within a single slot. Scheme 4 (TDM): two TRPs transmit PDSCH transmission occasions across K different slots alternatively.

In various embodiments, a UE needs to report needed CSI information for the network using the CSI framework. The triggering mechanism between a report setting and a resource setting can be summarized in Table 2.

TABLE 2

Triggering mechanism between a report setting and a resource setting

| | | Periodic CSI reporting | SP CSI reporting | AP CSI Reporting |
|---|---|---|---|---|
| Time Domain Behavior of Resource Setting | Periodic CSI-RS | RRC configured | MAC CE (PUCCH) DCI (PUSCH) | DCI |
| | SP CSI-RS | Not Supported | MAC CE (PUCCH) DCI (PUSCH) | DCI |
| | AP CSI-RS | Not Supported | Not Supported | DCI |

Moreover, all associated resource settings for a CSI report setting need to have same time domain behavior. Periodic CSI-RS/IM resource and CSI reports are assumed to be present and active once configured by RRC. Aperiodic and semi-persistent CSI-RS/IM resources and CSI reports should be explicitly triggered or activated. Joint triggering of aperiodic CSI-RS/IM resources and aperiodic CSI reports via transmitting DCI Format 0-1. Semi-persistent CSI-RS/IM resources and semi-persistent CSI reports are independently activated.

For multi-TRP URLLC, aperiodic CSI reporting is likely to be triggered to inform the network about the channel conditions for every transmission hypothesis, since using periodic CSI-RS for the TRPs in the coordination cluster constitutes a large overhead. As mentioned earlier, for aperiodic CSI-RS/IM resources and aperiodic CSI reports, the triggering is done jointly by transmitting a DCI Format 0-1. The DCI Format 0_1 contains a CSI request field (0 to 6 bits). A non-zero request field points to a so-called aperiodic trigger state configured by RRC (see FIG. 5). An aperiodic trigger state in turn is defined as a list of up to 16 aperiodic CSI Report Settings, identified by a CSI Report Setting ID for which the UE calculates simultaneously CSI and transmits it on the scheduled PUSCH transmission.

When the CSI Report Setting is linked with aperiodic Resource Setting (can comprise multiple Resource Sets), the aperiodic NZP CSI-RS Resource Set for channel measurement, the aperiodic CSI-IM Resource Set (if used) and the aperiodic NZP CSI-RS Resource Set for IM (if used) to use for a given CSI Report Setting are also included in the aperiodic trigger state definition (see FIG. 6). For aperiodic NZP CSI-RS, the QCL source to use is also configured in the aperiodic trigger state. The UE assumes that the resources used for the computation of the channel and interference can be processed with the same spatial filter i.e. quasi-co-located with respect to "QCL-TypeD."

In Table 3 it is summarized with a type of uplink channels used for CSI reporting as a function of the CSI codebook type.

TABLE 3

Uplink channels used for CSI reporting as a function of the CSI codebook type

| | Periodic CSI reporting | SP CSI reporting | AP CSI reporting |
|---|---|---|---|
| Type I WB | PUCCH Format 2,3,4 | PUCCH Format 2 PUSCH | PUSCH |
| Type I SB | | PUCCH Format 3,4 PUSCH | PUSCH |
| Type II WB | | PUCCH Format 3,4 PUSCH | PUSCH |
| Type II SB | | PUSCH | PUSCH |
| Type II Part 1 only | | PUCCH Format 3,4 | |

For aperiodic CSI reporting, PUSCH-based reports are divided into two CSI parts: CSI Part1 and CSI Part 2. The reason for this is that the size of CSI payload varies significantly, and therefore a worst-case UCI payload size design would result in large overhead. CSI Part 1 has a fixed payload size (and can be decoded by the gNB without prior information) and contains the following: 1) RI (if reported), CRI (if reported) and CQI for the first codeword; and 2) number of non-zero wideband amplitude coefficients per layer for Type II CSI feedback on PUSCH.

CSI Part 2 has a variable payload size that can be derived from the CSI parameters in CSI Part 1 and contains PMI and the CQI for the second codeword when RI>4. For example, if the aperiodic trigger state indicated by DCI format 0_1 defines 3 report settings x, y, and z, then the aperiodic CSI reporting for CSI part 2 will be ordered.

CSI reports may be prioritized according to: 1) time-domain behavior and physical channel, where more dynamic reports are given precedence over less dynamic reports and PUSCH has precedence over PUCCH; 2) CSI content, where beam reports (e.g., L1-RSRP reporting) has priority over regular CSI reports; 3) the serving cell to which the CSI corresponds (in case of CA operation). CSI corresponding to the PCell has priority over CSI corresponding to Scells; and/or 4) the CSI reporting setting ID reportConfigID. This ordering does not take into account that some multi-TRP NCJT transmission hypothesis, as measured by the UE, will achieve low spectral efficiency performance and should be given a lower priority.

In some embodiments, there may be a UCI bit sequence generation. The CSI report content in UCI, whether on PUCCH or PUSCH, may be provided in detail. The Rank Indicator (RI), if reported, has bitwidth of min($\lceil \log_2 N_{ports} \rceil$, $\lceil \log_2 n_{RI} \rceil$), where $N_{ports}$, $n_{RI}$ represent the number of antenna ports and the number of allowed rank indicator values, respectively. On the other hand, the CSI-RS Resource Indicator (CRI) and the Synchronization Signal Block Resource Indicator (SSBRI) each have bitwidths of $$\lceil \log_2 K_S^{CSI-RS} \rceil, \lceil \log_2 K_S^{SSB} \rceil,$$

respectively, where $$K_s^{CSI-RS}$$

is the number of CSI-RS resources in the corresponding resource set, and $$K_s^{SSB}$$

is the configured number of SS/PBCH blocks in the corresponding resource set for reporting 'ssb-Index-RSRP'. The mapping order of CSI fields of one CSI report with wideband PMI and wideband CQI on PUCCH is depicted in Table 4.

TABLE 4

Mapping order of CSI fields of one CSI report with wideband PMI and CQI on PUCCH

| CSI report number | CSI fields |
|---|---|
| CSI report #n | CRI, if reported<br>Rank Indicator, if reported<br>Layer Indicator, if reported<br>Zero padding bits, if needed<br>PMI wideband information fields, if reported<br>PMI wideband information, if reported<br>Wideband CQI for the first Transport Block, if reported<br>Wideband CQI for the second Transport Block, if reported |

It should be noted that one or more elements or features from one or more embodiments may be combined (e.g., for CSI measurement, feedback generation, and/or reporting) which may reduce the overall CSI feedback overhead.

In various embodiments: 1) the term "TRP" may refer to TRPs, cells, nodes, panels, communication (e.g., signals and/or channels) associated with a control resource set ("CORESET") pool, and/or communication associated with a TCI state from a transmission configuration including at least two TCI states; 2) a codebook type may be arbitrary—there may be a flexibility for using different codebook types (e.g., Type-I and Type-II codebooks); and/or 3) a UE may be triggered with two or more DCI, wherein a multi-TRP scheme may be based on spatial division multiplexing ("SDM") (e.g., scheme 1a), frequency division multiplexing ("FDM") (e.g., schemes 2a and/or 2b), and time division multiplexing ("TDM") (e.g., schemes 3 and/or 4). Other transmission schemes are not precluded.

In certain embodiments, there may be a CSI reporting configuration and feedback for multi-TRP. In such embodiments, a UE is configured by higher layers with one or more CSI-ReportConfig reporting settings for CSI reporting, one or more CSI-ResourceConfig resource settings for CSI measurement, and one or two lists of trigger states (e.g., given by the higher layer parameters CSI-AperiodicTriggerStateList and CSI-SemiPersistentOnPUSCH-TriggerStateList). Each trigger state in a CSI-AperiodicTriggerStateList may contain a list of a subset of associated CSI-ReportConfigs indicating resource set IDs for channel and optionally for interference. Each trigger state in a CSI-SemiPersistentOnPUSCH-TriggerStateList may contain one or more associated CSI-ReportConfig.

In a first set of embodiments, there may be an indication of multi-TRP transmission. Different embodiments for indication of multi-TRP transmission are found herein. Embodiments with a combination of one or more of the embodiments herein is not precluded.

In a first embodiment of the first set of embodiments, a UE configured with multi-TRP transmission may receive two physical downlink control channels ("PDCCHs"), wherein CORESETs (e.g., ControlResourceSets) corresponding to the two PDCCHs may have different values of a CORESET pool index (e.g., CORESETPoolIndex). Each PDCCH may schedule a physical downlink shared channel ("PDSCH"), or both PDCCHs may schedule one PDSCH (e.g., same or repetition of PDSCH scheduling assignment in each of the PDCCH).

In a second embodiment of the first set of embodiments, a UE configured with multi-TRP transmission may be configured with one or more CSI reporting settings CSI-ReportConfig, wherein at least one of the one or more CSI reporting settings CSI-ReportConfig includes a higher-layer parameter (e.g., mTRP-CSI-Enabled) that configures the UE with multi-TRP transmission (e.g., non-coherent joint transmission ("NCJT")). FIG. 4 is a schematic block diagram illustrating one embodiment of abstract syntax notation 1 ("ASN.1") code 400 for a CSI-ReportConfig reporting setting information element ("IE") with a multi-TRP transmission indication according to the second embodiment of the first set of embodiments.

In a third embodiment of the first set of embodiments, a UE configured with multi-TRP transmission may be configured with one or more CSI reporting settings CSI-ReportConfig, wherein at least one of the one or more CSI reporting settings CSI-ReportConfig includes a higher-layer parameter which triggers the UE to report a given number of CSI reports (e.g., numberOfReports) in the CSI-ReportConfig reporting setting or any of its elements (e.g., codebookConfig). FIG. 5 is a schematic block diagram illustrating one embodiment of ASN.1 code 500 for triggering more than one CSI report within a CSI-ReportConfig reporting setting IE according to the third embodiment of the first set of embodiments. FIG. 6 is a schematic block diagram illustrating one embodiment of ASN.1 code 600 for triggering two CSI reports within a CodebookConfig codebook configuration IE according to the third embodiment of the first set of embodiments.

In a fourth embodiment of the first set of embodiments, a UE configured with multi-TRP transmission may be configured with one or more CSI reporting settings CSI-ReportConfig, wherein at least one of the one or more CSI reporting settings CSI-ReportConfig configures two CodebookConfig codebook configurations corresponding to one or more CSI reports. FIG. 7 is a schematic block diagram illustrating one embodiment of ASN.1 code 700 for triggering two CSI reports within a CSI-ReportConfig reporting setting IE according to the fourth embodiment of the first set of embodiments.

In a fifth embodiment of the first set of embodiments, a UE configured with multi-TRP transmission may be configured with one or more CSI reporting settings CSI-ReportConfig, wherein at least one of the one or more CSI reporting settings CSI-ReportConfig configures two report quantities (e.g., reportQuantity) corresponding to one or more CSI reports. FIG. 8 is a schematic block diagram illustrating one embodiment of ASN.1 code 800 for triggering two CSI reports within a CSI-ReportConfig reporting setting IE according to the fifth embodiment of the first set of embodiments.

In a sixth embodiment of the first set of embodiments, a UE configured with multi-TRP transmission may be configured with an IE for repetition scheme configuration (e.g., RepetitionSchemeConfig-r17) in at least one PDSCH configuration PDSCH-Config, wherein the repetition scheme configuration contains a higher-layer parameter for a repetition scheme (e.g., repetitionScheme-r17) that is set to a value that corresponds to multi-TRP transmission with overlapping time and/or frequency resources (e.g., the parameter repetitionScheme-r17 is set to 'sdmSchemeA'). FIG. 9 is a schematic block diagram illustrating one embodiment of ASN.1 code 900 for a RepetitionSchemeConfig repetition scheme configuration IE according to the sixth embodiment of the first set of embodiments.

In a seventh embodiment of the first set of embodiments, a UE configured with multi-TRP transmission may be indicated with two TCI states in a codepoint of a DCI field (e.g., transmission configuration indication) and demodulation ("DM") reference signal ("RS") ("DM-RS") ports within two code division multiplexing ("CDM") groups in a DCI field (e.g., antenna ports).

In an eighth embodiment of the first set of embodiments, a UE configured with multi-TRP transmission may be configured with one or more CSI reporting settings CSI-ReportConfig, wherein at least one of the one or more CSI reporting settings CSI-ReportConfig includes a higher-layer parameter (e.g., mTRP-CSI-mode), which identifies whether the CSI configuration supports single-DCI based multi-TRP transmission, multi-DCI based multi-TRP transmission, or both. In a first example, the higher layer parameter mTRP-CSI-mode takes on one of three values corresponding to single-DCI based multi-TRP transmission, multi-DCI based multi-TRP transmission, or both. In a second example, the higher layer parameter mTRP-CSI-mode takes on one of two values corresponding to either single-DCI based multi-TRP transmission or multi-DCI based multi-TRP transmission. In a third example, the higher layer parameter mTRP-CSI-mode takes on one of two values corresponding to either single-DCI based multi-TRP transmission or both single-DCI based multi-TRP transmission and multi-DCI based multi-TRP transmission. It should be noted that this higher-layer parameter may be optional based on whether a second higher-layer parameter in the CSI reporting setting is enabled (e.g., mTRP-CSI-enabled). FIG. 10 is a schematic block diagram illustrating one embodiment of ASN.1 code 1000 for a CSI-ReportConfig reporting setting IE with a higher-layer parameter that triggers multi-TRP based CSI reporting according to the seventh embodiment of the first set of embodiments.

In some of the examples, a single-DCI based multi-TRP transmission may correspond to a transmission scheme comprising a PDSCH codeword transmitted from more than one TRP (e.g., the PDSCH codeword is associated to more than one TCI states). In some of the examples, a multi-DCI based multi-TRP transmission may correspond to a transmission scheme comprising a first PDSCH codeword transmitted from a first TRP (e.g., the first PDSCH codeword associated with a first TCI state), and a second PDSCH codeword transmitted from a second TRP (e.g., the second PDSCH codeword associated with a first TCI state).

In a second set of embodiments, there may be a unified NCJT CSI report for both single-DCI and multi-DCI based multi-TRP transmission. The UE may be configured to feed back a CSI report that supports multi-TRP transmission (e.g., NCJT), under both single-DCI transmission and multi-DCI transmission. Different embodiments that discuss the CSI report structure in this scenario are found herein. A setup with a combination of one or more of the embodiments is not precluded.

In a first embodiment of the second set of embodiments, a CSI report corresponding to NCJT may carry up to three channel quality indicator ("CQI") values, wherein a first of three CQI values corresponds to a codeword scheduled via single-DCI multi-TRP transmission, and a last two of three CQI values correspond to two codewords scheduled via multi-DCI multi-TRP transmission. The first of three CQI values may be included in Part 1 of the CSI report, whereas the last two of three CQI values may be included in Part 2 of the CSI report. It should be noted that the Part 2 of the CSI report may include one or more groups, wherein the last two of three CQI values are reported in a group subsequent to the first group. In one example, the last two of three CQI values are reported in a last group of CSI Part 2.

In a second embodiment of the second set of embodiments, a CSI report corresponding to NCJT may carry up to three CQI values, wherein a first of three CQI values corresponds to a codeword scheduled via single-DCI multi-TRP transmission, and a last two of three CQI values correspond to two codewords scheduled via multi-DCI multi-TRP transmission. The last two of three CQI values may be computed based on a differential function compared with the first of three CQI values. In a first example, the last two of three CQI values are reported with cqi-FormatIndicator set to 'differentialCQI'. In a second example, only the third CQI of three CQI values may be computed based on a differential function compared with the second of three CQI values, and the third of three CQI values are reported with cqi-FormatIndicator set to 'differentialCQT'.

In a third embodiment of the second set of embodiments, a CSI report corresponding to NCJT may carry up to three CQI values, wherein a first of three CQI values corresponds to a codeword scheduled via single-DCI multi-TRP transmission, and a last two of three CQI values correspond to two codewords scheduled via multi-DCI multi-TRP transmission. The last two of three CQI values are only reported for wideband channel. In one example, the last two of three CQI values are reported with cqi-FormatIndicator set to 'widebandCQI'.

In a third set of embodiments, there may be a CSI framework for multi-DCI based multi-TRP transmission. A UE is configured by higher layers with one or more CSI-ReportConfig CSI reporting settings for CSI reporting, wherein a CSI reporting setting includes a codebook configuration (e.g., CodebookConfig). Different embodiments that discuss the CSI framework under multi-DCI based multi-TRP transmission are provided herein. A setup with a combination of one or more embodiments is not precluded.

In a first embodiment of the third set of embodiments, a UE configured with a rank indicator restriction (e.g., typeI-SinglePanel-RI-Restriction) within a codebook configuration that does not restrict (or allows) rank indicator values greater than four is expected to be configured with reporting a CSI report for multi-DCI multi-TRP (e.g., multi-DCI NCJT CSI report).

In a second embodiment of the third set of embodiments, a UE configured with a CSI reporting setting corresponding to multi-DCI multi-TRP transmission is expected to be configured with a Type-I codebook only (e.g., typeI-SinglePanel) for codebook type.

In a third embodiment of the third set of embodiments, a UE configured with a CSI reporting setting corresponding to multi-DCI multi-TRP transmission is expected to be configured with up to two PMI (if applicable), up to two RI (if applicable), up to two LI (if applicable), up to two CQI (if applicable). In a first example, a UE configured with a CSI reporting setting corresponding to multi-DCI multi-TRP transmission is expected to be configured with up two PMI, two RI, two LI and two CQI. In a second example, a first of two CQI values is reported in CSI Part 1, and a second of two CQI values is reported in CSI Part 2.

In a fourth set of embodiments, there may be CSI report triggering for multi-DCI based multi-TRP transmission. Different embodiments that discuss the CSI report triggering for multi-DCI based multi-TRP are provided herein. A setup with a combination of one or more embodiments is not precluded.

In a first embodiment of the fourth set of embodiments, CSI reporting corresponding to multi-DCI based multi-TRP transmission is triggered with aperiodic CSI reporting only, which is triggered via a CSI request field in an uplink-channel scheduling DCI (e.g., DCI Format 0_1) scheduling a PUSCH transmission.

In a second embodiment of the fourth set of embodiments, CSI reporting corresponding to multi-DCI based multi-TRP transmission with up to three CQI is triggered with aperiodic CSI reporting only, which is triggered via a CSI request field in an uplink-channel scheduling DCI (e.g., DCI Format 01) scheduling a PUSCH transmission.

In a third embodiment of the fourth set of embodiments, CSI reporting corresponding to multi-DCI based multi-TRP transmission with up to two CQI is triggered with aperiodic CSI reporting only, which is triggered via a CSI request field in an uplink-channel scheduling DCI (e.g., DCI Format 01) scheduling a PUSCH transmission.

In a fifth set of embodiments, there may be explicit CSI reporting setting under multi-DCI based multi-TRP transmission. In such embodiments, the CSI reporting setting is explicit (e.g., the UE receives two CSI reporting settings corresponding to multi-DCI based multi-TRP transmission). Different embodiments are provided herein. A setup with a combination of one or more embodiments is not precluded.

In a first embodiment of the fifth set of embodiments, a UE is expected to receive two CSI-ReportConfig reporting settings under multi-DCI based multi-TRP transmission, wherein a first of the two CSI reporting settings includes an identification of a second of the two CSI reporting settings (e.g., CSI-ReportConfigId). FIG. 11 is a schematic block diagram illustrating one embodiment of ASN.1 code 1100 for a CSI-ReportConfig reporting setting IE with indication of a second CSI-ReportConfig reporting setting according to the first embodiment of the fifth set of embodiments.

In a second embodiment of the fifth set of embodiments, when a UE receives a first of two CSI-ReportConfig reporting settings that includes an identification of a second of two CSI-ReportConfig reporting settings (e.g., CSI-ReportConfigId), a CSI report corresponding to the first of two CSI reporting settings has a higher priority than a CSI report corresponding to the second of two CSI reporting settings. Alternatively, the CSI report corresponding to the first of two CSI reporting settings may have a lower priority than the CSI report corresponding to the second of two CSI reporting settings.

In a third embodiment of the fifth set of embodiments, when a UE receives two CSI-ReportConfig reporting settings, a CSI report corresponding to a first of the two CSI reporting settings with a lower identification number (e.g., CSI-ReportConfigId) has a higher priority than a CSI report corresponding to a second of two CSI reporting settings with a higher identification number. Alternatively, the CSI report corresponding to the first of the two CSI reporting settings with a lower identification number may have a lower priority than a CSI report corresponding to the second of two CSI reporting settings with a higher identification number.

In a fourth embodiment of the fifth set of embodiments, when a UE receives up to two CSI-ReportConfig reporting settings with a total of at least two non-zero power ("NZP") CSI reference signal ("RS") ("CSI-RS") resources for channel measurement (e.g., channel measurement resources ("CMRs")) identified within the up to two CSI reporting settings, a CSI report corresponding to a first of the at least two NZP CSI-RS resources with a lower identification number (e.g., NZP-CSI-RS-ResourceId or NZP-CSI-RS-ResourceSetId associated to the NZP CSI-RS Resource or CSI-ResourceConfigId associated to the NZP CSI-RS resource) has a higher priority than a CSI report corresponding to a second of the at least two NZP CSI-RS resources with a higher identification number. Alternatively, the CSI report corresponding to the first of the at least two NZP CSI-RS resources with a lower identification number may have a lower priority than the CSI report corresponding to the second of the at least two NZP CSI-RS resources with a higher identification number.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")), or higher than 6 GHz (e.g., frequency range 2 ("FR2") or millimeter wave ("mmWave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., inphase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 12:
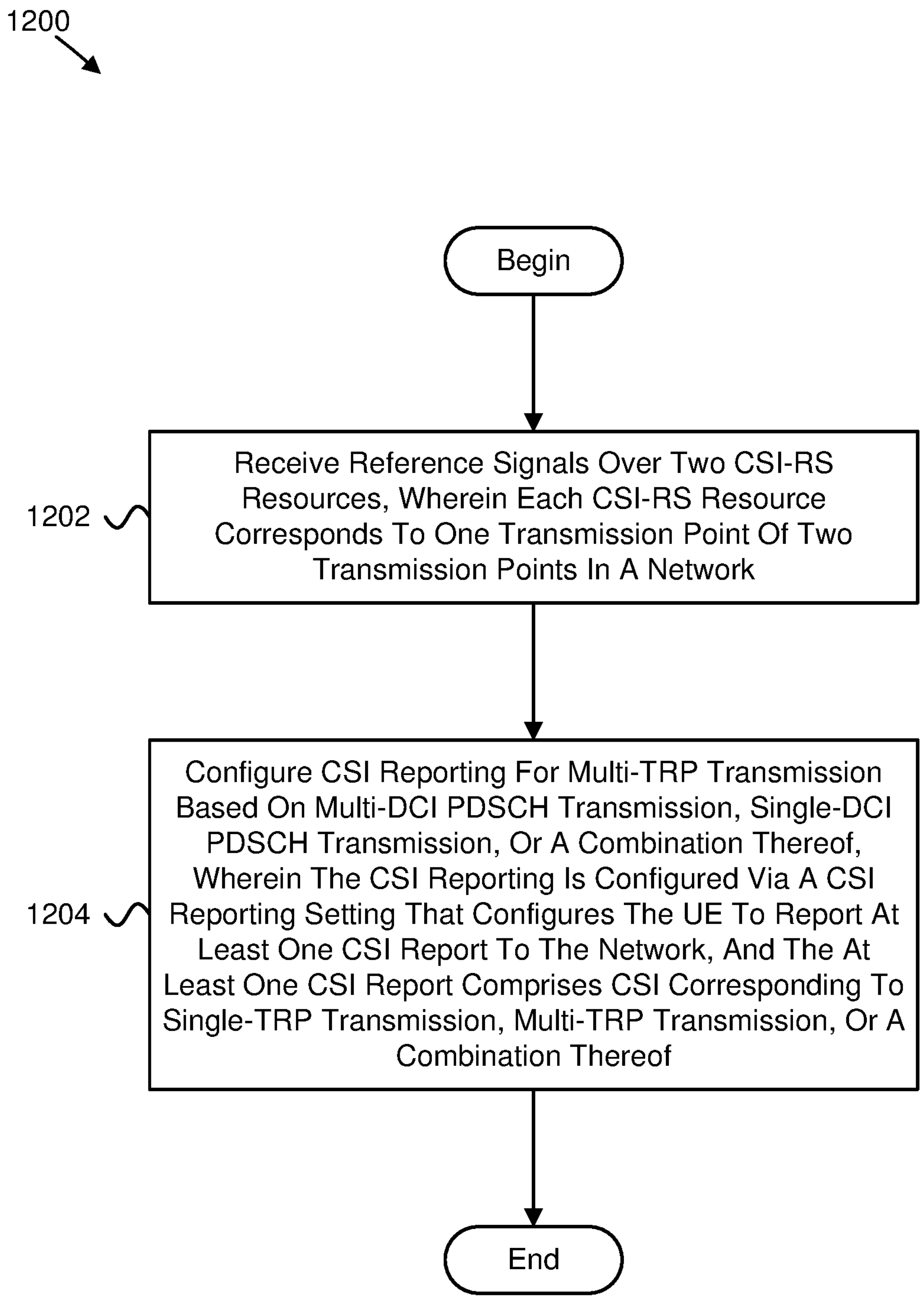
FIG. 12 is a flow chart diagram illustrating one embodiment of a method for configuring CSI reporting for multi-TRP transmission.

FIG. 12 is a flow chart diagram illustrating one embodiment of a method 1200 for configuring CSI reporting for multi-TRP transmission. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

In various embodiments, the method 1200 includes receiving 1202 reference signals over two CSI-RS resources. Each CSI-RS resource corresponds to one transmission point of two transmission points in a network. In some embodiments, the method 1200 includes configuring 1204 CSI reporting for multi-TRP transmission based on multi-DCI PDSCH transmission, single-DCI PDSCH transmission, or a combination thereof. The CSI reporting is configured via a CSI reporting setting that configures the UE to report at least one CSI report to the network, and the at least one CSI report comprises CSI corresponding to single-TRP transmission, multi-TRP transmission, or a combination thereof.

In certain embodiments, the method 1200 further comprises receiving two PDCCH transmissions, wherein CORESETs corresponding to the two PDCCH transmissions have different values of a CORESET pool index parameter. In some embodiments, the CSI reporting setting includes a higher-layer parameter that identifies whether CSI reporting for multi-TRP transmission supports multi-DCI transmission, single-DCI transmission, or a combination thereof. In various embodiments, a CSI report comprising CSI corresponding to multi-TRP transmission carries up to three CQI values, a first CQI value of the up to three CQI values corresponds to a codeword scheduled via single-DCI multi-TRP transmission, and a last two CQI values of the up to three CQI values correspond to two codewords scheduled via multi-DCI multi-TRP transmission.

In one embodiment, the first CQI value of the up to three CQI values is included in a first part of the CSI report, and the last two CQI values of the up to three CQI values are included in a second part of the CSI report. In certain embodiments, the last two CQI values of the up to three CQI values are: reported as differential values computed with respect to the first CQI value of the up to three CQI values; reported in a wideband format; or a combination thereof. In some embodiments, the CSI report comprising CSI corresponding to multi-TRP transmission is triggered with aperiodic CSI reporting.

In various embodiments, a CSI report corresponding to multi-TRP transmission is based on multi-DCI PDSCH. In one embodiment, the CSI report corresponding to multi-TRP transmission based on multi-DCI PDSCH comprises two CQI values, a first CQI value of the two CQI values is reported in a first part of two parts of the CSI report, and a second CQI value of the two CQI values is reported in a second part of the two parts of the CSI report. In certain embodiments, the CSI report corresponding to multi-TRP transmission based on multi-DCI PDSCH is configured with: a rank indicator restriction that does not restrict the UE from reporting a rank indicator value greater than four; a codebook configuration corresponding to a Type-I codebook; a time-domain behavior of CSI reporting corresponding to aperiodic CSI reporting; or some combination thereof.

In some embodiments, the method 1200 further comprises receiving two CSI reporting settings, wherein a first CSI reporting setting of the two CSI reporting settings triggers a first CSI report, and a second CSI reporting setting of the two CSI reporting settings triggers a second CSI report. In various embodiments, the first CSI reporting setting of the two CSI reporting settings includes an identification of the second CSI reporting setting of the two CSI reporting settings. In one embodiment, a priority order of the first CSI report and the second CSI report is based on identification numbers of the two CSI reporting settings corresponding to the two CSI reports.

Figure 13:
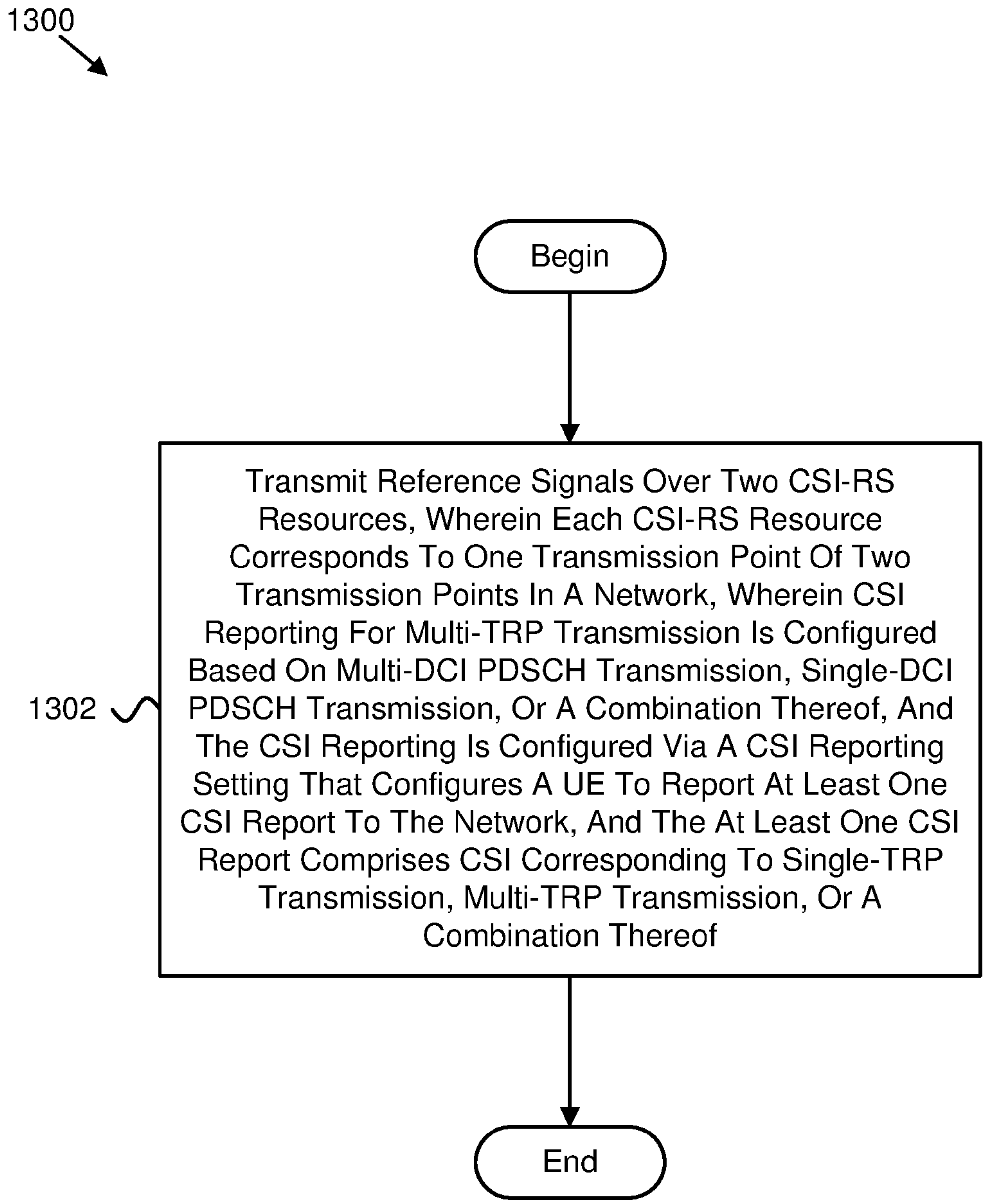
FIG. 13 is a flow chart diagram illustrating another embodiment of a method for configuring CSI reporting for multi-TRP transmission.

FIG. 13 is a flow chart diagram illustrating another embodiment of a method 1300 for configuring CSI reporting for multi-TRP transmission. In some embodiments, the method 1300 is performed by an apparatus, such as at least one network unit 104. In certain embodiments, the method 1300 may be performed by a processor executing program code, for example, a microcontroller, a microprocessor, a CPU, a GPU, an auxiliary processing unit, a FPGA, or the like.

In various embodiments, the method 1300 includes transmitting 1302 reference signals over two CSI-RS resources. Each CSI-RS resource corresponds to one transmission point of two transmission points in a network. CSI reporting for multi-TRP transmission is configured based on multi-DCI PDSCH transmission, single-DCI PDSCH transmission, or a combination thereof, and the CSI reporting is configured via a CSI reporting setting that configures a UE to report at least one CSI report to the network, and the at least one CSI report comprises CSI corresponding to single-TRP transmission, multi-TRP transmission, or a combination thereof.

In certain embodiments, the method 1300 further comprises transmitting two PDCCH transmissions, wherein CORESETs corresponding to the two PDCCH transmissions have different values of a CORESET pool index parameter. In some embodiments, the CSI reporting setting includes a higher-layer parameter that identifies whether CSI reporting for multi-TRP transmission supports multi-DCI transmission, single-DCI transmission, or a combination thereof. In various embodiments, a CSI report comprising CSI corresponding to multi-TRP transmission carries up to three CQI values, a first CQI value of the up to three CQI values corresponds to a codeword scheduled via single-DCI multi-TRP transmission, and a last two CQI values of the up to three CQI values correspond to two codewords scheduled via multi-DCI multi-TRP transmission.

In one embodiment, the first CQI value of the up to three CQI values is included in a first part of the CSI report, and the last two CQI values of the up to three CQI values are included in a second part of the CSI report. In certain embodiments, the last two CQI values of the up to three CQI values are: reported as differential values computed with respect to the first CQI value of the up to three CQI values; reported in a wideband format; or a combination thereof. In some embodiments, the CSI report comprising CSI corresponding to multi-TRP transmission is triggered with aperiodic CSI reporting.

In various embodiments, a CSI report corresponding to multi-TRP transmission is based on multi-DCI PDSCH. In one embodiment, the CSI report corresponding to multi-TRP transmission based on multi-DCI PDSCH comprises two CQI values, a first CQI value of the two CQI values is reported in a first part of two parts of the CSI report, and a second CQI value of the two CQI values is reported in a second part of the two parts of the CSI report. In certain embodiments, the CSI report corresponding to multi-TRP transmission based on multi-DCI PDSCH is configured with: a rank indicator restriction that does not restrict the UE from reporting a rank indicator value greater than four; a codebook configuration corresponding to a Type-I codebook; a time-domain behavior of CSI reporting corresponding to aperiodic CSI reporting; or some combination thereof.

In some embodiments, the method 1300 further comprises transmitting two CSI reporting settings, wherein a first CSI reporting setting of the two CSI reporting settings triggers a first CSI report, and a second CSI reporting setting of the two CSI reporting settings triggers a second CSI report. In various embodiments, the first CSI reporting setting of the two CSI reporting settings includes an identification of the second CSI reporting setting of the two CSI reporting settings. In one embodiment, a priority order of the first CSI report and the second CSI report is based on identification numbers of the two CSI reporting settings corresponding to the two CSI reports.

In one embodiment, an apparatus comprise: a receiver to receive reference signals over two CSI-RS resources, wherein each CSI-RS resource corresponds to one transmission point of two transmission points in a network; and a processor to configure CSI reporting for multi-TRP transmission based on multi-DCI PDSCH transmission, single-DCI PDSCH transmission, or a combination thereof, wherein the CSI reporting is configured via a CSI reporting setting that configures the UE to report at least one CSI report to the network, and the at least one CSI report comprises CSI corresponding to single-TRP transmission, multi-TRP transmission, or a combination thereof.

In certain embodiments, the receiver further to receive two PDCCH transmissions, wherein CORESETs corresponding to the two PDCCH transmissions have different values of a CORESET pool index parameter.

In some embodiments, the CSI reporting setting includes a higher-layer parameter that identifies whether CSI reporting for multi-TRP transmission supports multi-DCI transmission, single-DCI transmission, or a combination thereof.

In various embodiments, a CSI report comprising CSI corresponding to multi-TRP transmission carries up to three CQI values, a first CQI value of the up to three CQI values corresponds to a codeword scheduled via single-DCI multi-TRP transmission, and a last two CQI values of the up to three CQI values correspond to two codewords scheduled via multi-DCI multi-TRP transmission.

In one embodiment, the first CQI value of the up to three CQI values is included in a first part of the CSI report, and the last two CQI values of the up to three CQI values are included in a second part of the CSI report.

In certain embodiments, the last two CQI values of the up to three CQI values are: reported as differential values computed with respect to the first CQI value of the up to three CQI values; reported in a wideband format; or a combination thereof.

In some embodiments, the CSI report comprising CSI corresponding to multi-TRP transmission is triggered with aperiodic CSI reporting.

In various embodiments, a CSI report corresponding to multi-TRP transmission is based on multi-DCI PDSCH.

In one embodiment, the CSI report corresponding to multi-TRP transmission based on multi-DCI PDSCH comprises two CQI values, a first CQI value of the two CQI values is reported in a first part of two parts of the CSI report, and a second CQI value of the two CQI values is reported in a second part of the two parts of the CSI report.

In certain embodiments, the CSI report corresponding to multi-TRP transmission based on multi-DCI PDSCH is configured with: a rank indicator restriction that does not restrict the UE from reporting a rank indicator value greater than four; a codebook configuration corresponding to a Type-I codebook; a time-domain behavior of CSI reporting corresponding to aperiodic CSI reporting; or some combination thereof.

In some embodiments, the receiver further to receive two CSI reporting settings, wherein a first CSI reporting setting of the two CSI reporting settings triggers a first CSI report, and a second CSI reporting setting of the two CSI reporting settings triggers a second CSI report.

In various embodiments, the first CSI reporting setting of the two CSI reporting settings includes an identification of the second CSI reporting setting of the two CSI reporting settings.

In one embodiment, a priority order of the first CSI report and the second CSI report is based on identification numbers of the two CSI reporting settings corresponding to the two CSI reports.

In one embodiment, a method in a UE comprises: receiving reference signals over two CSI-RS resources, wherein each CSI-RS resource corresponds to one transmission point of two transmission points in a network; and configuring CSI reporting for multi-TRP transmission based on multi-DCI PDSCH transmission, single-DCI PDSCH transmission, or a combination thereof, wherein the CSI reporting is configured via a CSI reporting setting that configures the UE to report at least one CSI report to the network, and the at least one CSI report comprises CSI corresponding to single-TRP transmission, multi-TRP transmission, or a combination thereof.

In certain embodiments, the method further comprises receiving two PDCCH transmissions, wherein CORESETs corresponding to the two PDCCH transmissions have different values of a CORESET pool index parameter.

In some embodiments, the CSI reporting setting includes a higher-layer parameter that identifies whether CSI reporting for multi-TRP transmission supports multi-DCI transmission, single-DCI transmission, or a combination thereof.

In various embodiments, a CSI report comprising CSI corresponding to multi-TRP transmission carries up to three CQI values, a first CQI value of the up to three CQI values corresponds to a codeword scheduled via single-DCI multi-TRP transmission, and a last two CQI values of the up to three CQI values correspond to two codewords scheduled via multi-DCI multi-TRP transmission.

In one embodiment, the first CQI value of the up to three CQI values is included in a first part of the CSI report, and the last two CQI values of the up to three CQI values are included in a second part of the CSI report.

In certain embodiments, the last two CQI values of the up to three CQI values are: reported as differential values computed with respect to the first CQI value of the up to three CQI values; reported in a wideband format; or a combination thereof.

In some embodiments, the CSI report comprising CSI corresponding to multi-TRP transmission is triggered with aperiodic CSI reporting.

In various embodiments, a CSI report corresponding to multi-TRP transmission is based on multi-DCI PDSCH.

In one embodiment, the CSI report corresponding to multi-TRP transmission based on multi-DCI PDSCH comprises two CQI values, a first CQI value of the two CQI values is reported in a first part of two parts of the CSI report, and a second CQI value of the two CQI values is reported in a second part of the two parts of the CSI report.

In certain embodiments, the CSI report corresponding to multi-TRP transmission based on multi-DCI PDSCH is configured with: a rank indicator restriction that does not restrict the UE from reporting a rank indicator value greater than four; a codebook configuration corresponding to a Type-I codebook; a time-domain behavior of CSI reporting corresponding to aperiodic CSI reporting; or some combination thereof.

In some embodiments, the method further comprises receiving two CSI reporting settings, wherein a first CSI reporting setting of the two CSI reporting settings triggers a first CSI report, and a second CSI reporting setting of the two CSI reporting settings triggers a second CSI report.

In various embodiments, the first CSI reporting setting of the two CSI reporting settings includes an identification of the second CSI reporting setting of the two CSI reporting settings.

In one embodiment, a priority order of the first CSI report and the second CSI report is based on identification numbers of the two CSI reporting settings corresponding to the two CSI reports.

In one embodiment, an apparatus comprises: at least one transmitter to transmit reference signals over two CSI-RS resources, wherein each CSI-RS resource corresponds to one transmission point of two transmission points in a network, CSI reporting for multi-TRP transmission is configured based on multi-DCI PDSCH transmission, single-DCI PDSCH transmission, or a combination thereof, and the CSI reporting is configured via a CSI reporting setting that configures a UE to report at least one CSI report to the network, and the at least one CSI report comprises CSI corresponding to single-TRP transmission, multi-TRP transmission, or a combination thereof.

In certain embodiments, the at least one transmitter further to transmit two PDCCH transmissions, and CORESETs corresponding to the two PDCCH transmissions have different values of a CORESET pool index parameter.

In some embodiments, the CSI reporting setting includes a higher-layer parameter that identifies whether CSI reporting for multi-TRP transmission supports multi-DCI transmission, single-DCI transmission, or a combination thereof.

In various embodiments, a CSI report comprising CSI corresponding to multi-TRP transmission carries up to three CQI values, a first CQI value of the up to three CQI values corresponds to a codeword scheduled via single-DCI multi-TRP transmission, and a last two CQI values of the up to three CQI values correspond to two codewords scheduled via multi-DCI multi-TRP transmission.

In one embodiment, the first CQI value of the up to three CQI values is included in a first part of the CSI report, and the last two CQI values of the up to three CQI values are included in a second part of the CSI report.

In certain embodiments, the last two CQI values of the up to three CQI values are: reported as differential values computed with respect to the first CQI value of the up to three CQI values; reported in a wideband format; or a combination thereof.

In some embodiments, the CSI report comprising CSI corresponding to multi-TRP transmission is triggered with aperiodic CSI reporting.

In various embodiments, a CSI report corresponding to multi-TRP transmission is based on multi-DCI PDSCH.

In one embodiment, the CSI report corresponding to multi-TRP transmission based on multi-DCI PDSCH comprises two CQI values, a first CQI value of the two CQI values is reported in a first part of two parts of the CSI report, and a second CQI value of the two CQI values is reported in a second part of the two parts of the CSI report.

In certain embodiments, the CSI report corresponding to multi-TRP transmission based on multi-DCI PDSCH is configured with: a rank indicator restriction that does not restrict the UE from reporting a rank indicator value greater than four; a codebook configuration corresponding to a Type-I codebook; a time-domain behavior of CSI reporting corresponding to aperiodic CSI reporting; or some combination thereof.

In some embodiments, the at least one transmitter further to transmit two CSI reporting settings, and a first CSI reporting setting of the two CSI reporting settings triggers a first CSI report, and a second CSI reporting setting of the two CSI reporting settings triggers a second CSI report.

In various embodiments, the first CSI reporting setting of the two CSI reporting settings includes an identification of the second CSI reporting setting of the two CSI reporting settings.

In one embodiment, a priority order of the first CSI report and the second CSI report is based on identification numbers of the two CSI reporting settings corresponding to the two CSI reports.

In one embodiment, a method in at least one network device comprises: transmitting reference signals over two CSI-RS resources, wherein each CSI-RS resource corresponds to one transmission point of two transmission points in a network, CSI reporting for multi-TRP transmission is configured based on multi-DCI PDSCH transmission, single-DCI PDSCH transmission, or a combination thereof, and the CSI reporting is configured via a CSI reporting setting that configures a UE to report at least one CSI report to the network, and the at least one CSI report comprises CSI corresponding to single-TRP transmission, multi-TRP transmission, or a combination thereof.

In certain embodiments, the method further comprises transmitting two PDCCH transmissions, wherein CORESETs corresponding to the two PDCCH transmissions have different values of a CORESET pool index parameter.

In some embodiments, the CSI reporting setting includes a higher-layer parameter that identifies whether CSI reporting for multi-TRP transmission supports multi-DCI transmission, single-DCI transmission, or a combination thereof.

In various embodiments, a CSI report comprising CSI corresponding to multi-TRP transmission carries up to three CQI values, a first CQI value of the up to three CQI values corresponds to a codeword scheduled via single-DCI multi-TRP transmission, and a last two CQI values of the up to three CQI values correspond to two codewords scheduled via multi-DCI multi-TRP transmission.

In one embodiment, the first CQI value of the up to three CQI values is included in a first part of the CSI report, and the last two CQI values of the up to three CQI values are included in a second part of the CSI report.

In certain embodiments, the last two CQI values of the up to three CQI values are: reported as differential values computed with respect to the first CQI value of the up to three CQI values; reported in a wideband format; or a combination thereof.

In some embodiments, the CSI report comprising CSI corresponding to multi-TRP transmission is triggered with aperiodic CSI reporting.

In various embodiments, a CSI report corresponding to multi-TRP transmission is based on multi-DCI PDSCH.

In one embodiment, the CSI report corresponding to multi-TRP transmission based on multi-DCI PDSCH comprises two CQI values, a first CQI value of the two CQI values is reported in a first part of two parts of the CSI report, and a second CQI value of the two CQI values is reported in a second part of the two parts of the CSI report.

In certain embodiments, the CSI report corresponding to multi-TRP transmission based on multi-DCI PDSCH is configured with: a rank indicator restriction that does not restrict the UE from reporting a rank indicator value greater than four; a codebook configuration corresponding to a Type-I codebook; a time-domain behavior of CSI reporting corresponding to aperiodic CSI reporting; or some combination thereof.

In some embodiments, the method further comprises transmitting two CSI reporting settings, wherein a first CSI reporting setting of the two CSI reporting settings triggers a first CSI report, and a second CSI reporting setting of the two CSI reporting settings triggers a second CSI report.

In various embodiments, the first CSI reporting setting of the two CSI reporting settings includes an identification of the second CSI reporting setting of the two CSI reporting settings.

In one embodiment, a priority order of the first CSI report and the second CSI report is based on identification numbers of the two CSI reporting settings corresponding to the two CSI reports.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:

at least one memory; and at least one processor coupled with the at least one memory and configured to cause the UE to:

receive reference signals over two channel state information (CSI) reference signal (RS) (CSI-RS) resources, wherein each CSI-RS resource corresponds to one transmission point of two transmission points in a network;

receive a CSI reporting setting corresponding to multiple transmission and reception point (TRP) (multi-TRP) transmission based on multiple downlink control information (DCI) (multi-DCI) physical downlink shared channel (PDSCH) transmission, single-DCI PDSCH transmission, or a combination thereof; and report at least one CSI report to the network, the at least one CSI report comprises CSI corresponding to single-TRP transmission, multi-TRP transmission, or a combination thereof, based on the CSI reporting setting, wherein a CSI report comprising CSI corresponding to multi-TRP transmission carries up to three channel quality indicator (CQI) values, a first CQI value of the up to three CQI values corresponds to a codeword scheduled via single-DCI multi-TRP transmission, and a last two COI values of the up to three CQI values correspond to two codewords scheduled via multi-DCI multi-TRP transmission.

2. The UE of claim 1, wherein the at least one processor is configured to cause the UE to receive two physical downlink control channel (PDCCH) transmissions, and control resource sets (CORESETs) corresponding to the two PDCCH transmissions have different values of a CORESET pool index parameter.

3. The UE of claim 1, wherein the CSI reporting setting includes a higher-layer parameter that identifies whether CSI reporting for multi-TRP transmission supports multi-DCI transmission, single-DCI transmission, or a combination thereof.

4. The UE of claim 1, wherein the first CQI value of the up to three CQI values is included in a first part of the CSI report, and the last two CQI values of the up to three CQI values are included in a second part of the CSI report.

5. The UE of claim 1, wherein the last two CQI values of the up to three CQI values are:

reported as differential values computed with respect to the first CQI value of the up to three CQI values;

reported in a wideband format;

or a combination thereof.

6. The UE of claim 1, wherein the CSI report comprising CSI corresponding to multi-TRP transmission is triggered with aperiodic CSI reporting.

7. The UE of claim 1, wherein a CSI report corresponding to multi-TRP transmission is based on multi-DCI PDSCH.

8. The UE of claim 7, wherein the CSI report corresponding to multi-TRP transmission based on multi-DCI PDSCH comprises two CQI values, a first CQI value of the two CQI values is reported in a first part of two parts of the CSI report, and a second CQI value of the two CQI values is reported in a second part of the two parts of the CSI report.

9. The UE of claim 7, wherein the CSI report corresponding to multi-TRP transmission based on multi-DCI PDSCH is configured with:

a rank indicator restriction that does not restrict the UE from reporting a rank indicator value greater than four;

a codebook configuration corresponding to a Type-I codebook;

a time-domain behavior of CSI reporting corresponding to aperiodic CSI reporting;

or a combination thereof.

10. The UE of claim 1, wherein the at least one processer is configured to cause the UE to receive two CSI reporting settings, and a first CSI reporting setting of the two CSI reporting settings triggers a first CSI report, and a second CSI reporting setting of the two CSI reporting settings triggers a second CSI report.

11. The UE of claim 10, wherein the first CSI reporting setting of the two CSI reporting settings includes an identification of the second CSI reporting setting of the two CSI reporting settings.

12. The UE of claim 10, wherein a priority order of the first CSI report and the second CSI report is based on identification numbers of the two CSI reporting settings corresponding to the two CSI reports.

13. A method performed by a user equipment (UE), the method comprising:

receiving reference signals over two channel state information (CSI) reference signal (RS) (CSI-RS) resources, wherein each CSI-RS resource corresponds to one transmission point of two transmission points in a network;

receiving a CSI reporting setting corresponding to multiple transmission and reception point (TRP) (multi-TRP) transmission based on multiple downlink control information (DCI) (multi-DCI) physical downlink shared channel (PDSCH) transmission, single-DCI PDSCH transmission, or a combination thereof; and reporting at least one CSI report to the network, the at least one CSI report comprises CSI corresponding to single-TRP transmission, multi-TRP transmission, or a combination thereof, based on the CSI reporting setting, wherein a CSI report comprising CSI corresponding to multi-TRP transmission carries up to three channel quality indicator (CQI) values, a first CQI value of the up to three COI values corresponds to a codeword scheduled via single-DCI multi-TRP transmission, and a last two CQI values of the up to three COI values correspond to two codewords scheduled via multi-DCI multi-TRP transmission.

14. A base station, comprising:

at least one memory; and at least one processor coupled with the at least one memory and configured to cause the base station to:

transmit reference signals over two channel state information (CSI) reference signal (RS) (CSI-RS) resources, wherein each CSI-RS resource corresponds to one transmission point of two transmission points in a network; and transmit a CSI reporting setting corresponding to multiple transmission and reception point (TRP) (multi-TRP) transmission is configured based on multiple downlink control information (DCI) (multi-DCI) physical downlink shared channel (PDSCH) transmission, single-DCI PDSCH transmission, or a combination thereof, wherein at least one CSI report is reported to the network, the at least one CSI report comprises CSI corresponding to single-TRP transmission, multi-TRP transmission, or a combination thereof, based on the CSI reporting setting, wherein a CSI report comprising CSI corresponding to multi-TRP transmission carries up to three channel quality indicator (CQI) values, a first CQI value of the up to three COI values corresponds to a codeword scheduled via single-DCI multi-TRP transmission, and a last two COI values of the up to three CQI values correspond to two codewords scheduled via multi-DCI multi-TRP transmission.

15. A processor for wireless communication, comprising:

at least one controller coupled with at least one memory and configured to cause the processor to:

receive reference signals over two channel state information (CSI) reference signal (RS) (CSI-RS) resources, wherein each CSI-RS resource corresponds to one transmission point of two transmission points in a network;

receive a CSI reporting setting corresponding to multiple transmission and reception point (TRP) (multi-TRP) transmission based on multiple downlink control information (DCI) (multi-DCI) physical downlink shared channel (PDSCH) transmission, single-DCI PDSCH transmission, or a combination thereof; and report at least one CSI report to the network, the at least one CSI report comprises CSI corresponding to single-TRP transmission, multi-TRP transmission, or a combination thereof, based on the CSI reporting setting, wherein a CSI report comprising CSI corresponding to multi-TRP transmission carries up to three channel quality indicator (CQI) values, a first COI value of the up to three CQI values corresponds to a codeword scheduled via single-DCI multi-TRP transmission, and a last two CQI values of the up to three CQI values correspond to two codewords scheduled via multi-DCI multi-TRP transmission.

16. The processor of claim 15, wherein the at least one controller is configured to cause the processor to receive two physical downlink control channel (PDCCH) transmissions, and control resource sets (CORESETs) corresponding to the two PDCCH transmissions have different values of a CORESET pool index parameter.

17. The processor of claim 15, wherein the CSI reporting setting includes a higher-layer parameter that identifies whether CSI reporting for multi-TRP transmission supports multi-DCI transmission, single-DCI transmission, or a combination thereof.

18. The processor of claim 15, wherein the first CQI value of the up to three CQI values is included in a first part of the CSI report, and the last two CQI values of the up to three CQI values are included in a second part of the CSI report.

* * * * *